United States Patent Office 3,495,400
Patented Feb. 17, 1970

3,495,400
NON-ROTATABLE CONNECTOR BASE
Roger L. Gower, P.O. Box 65,
Canaan, Maine 04924
Filed June 5, 1967, Ser. No. 643,426
Int. Cl. F16g *15/00;* B60c *11/00, 27/00*
U.S. Cl. 59—93                                                4 Claims

ABSTRACT OF THE DISCLOSURE

The present disclosure relates to a non-rotatable base for a weldless connector device for chain and cable assemblies.

---

It is the purpose of the present invention to provide a base for connector hooks which will prevent turning or swiveling of the hook with respect to the chain through which it is interlinked.

There are many uses in chain assemblies for which hooks of conventional design have heretofore been integrally attached to shanks terminating in flattened, generally circular, plate-like bases lying in a plane perpendicular to the longitudinal axis of the shank.

When said hooks are interlinked through chain, the face of the swivel base adjacent the shank rests against the flat side of the link through which the hook has been inserted, and the hook end is interlinked through another chain which forms a part of the required assembly. These are found, for example, in certain types of tire chains and traction assemblies for vehicles.

In service, such second, or cross, chains may be forced into rotation where the drag of traction may cause a cross-chain to rotate on its own axis. As a result of the tension upon and rotation of the cross-chain, the swivel hook likewise rotates, with its swivel base resting in abrasive contact upon the side of the link through which it has been inserted, and causing excessive wear thereon.

The rotation of the cross-chain on its own axis serves no useful purposes in increasing the traction provided by the tire chains, but, contrariwise, it causes abrasion of the side chains and thus it is frequently the side chains, rather than the cross-chains, that fail.

In order to reduce the wear on the side chains, and to provide for greater strength in the assembly, the present invention has been devised with the base plate, at the distant end of the shank from the hook, having oppositely disposed concave arcs defining radii sufficient for the bearings formed by said arcs to accommodate the ends of the links adjacent to and interlinked through the link through which said hook has been inserted.

In the accompanying drawings forming a part of this application, in which like numerals are employed to designate like parts throughout the same, FIGURE 1 is a top elevation of the base plate of a connector hook;

Figures 1, 2:
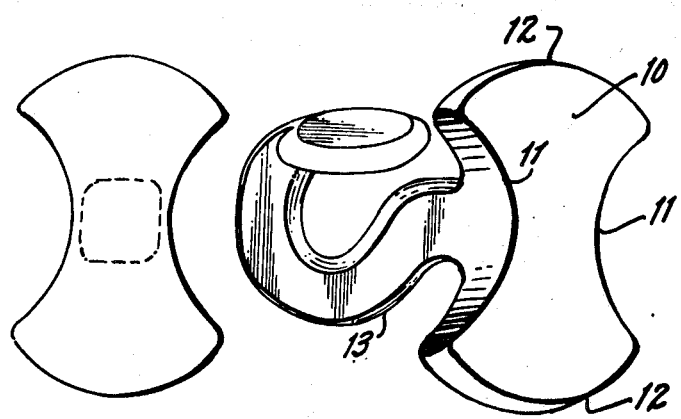
FIGURE 2 is a perspective view of said base.

Referring to the drawings, and particularly to FIGURE 1, base 10 is shown having oppositely disposed concave arcs 11, 11, and convex arcs 12, 12, likewise oppositely disposed and having radii substantially equal to the radii of arcs 11, 11.

FIGURE 2 shows a perspective view of said base, with said concave arcs 11, 11 and convex arcs 12, 12 and a portion of shank 13 which is integral with said connector base.

Figure 3:
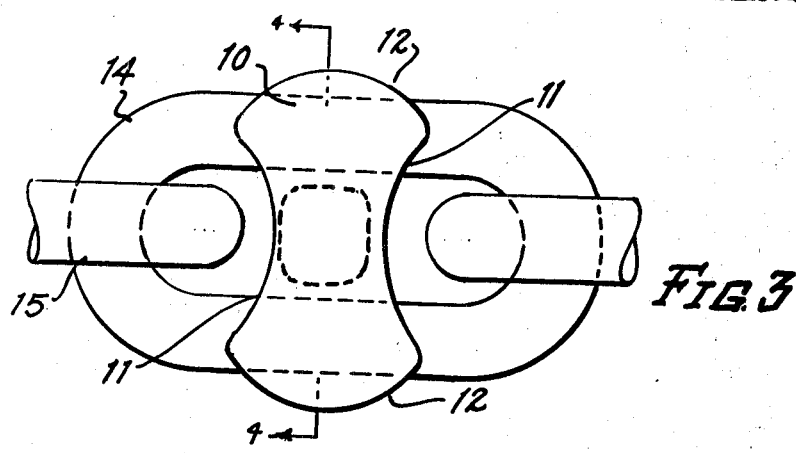
FIGURE 3 shows a hook base of the present invention inserted through a link of chain.

In FIGURE 3, the connector base of the present invention is shown from a face view thereof, interlinked through a link of chain 14, with the bearings formed by said concave arcs 11, 11 in proximate contiguity with the ends of the adjacent links of chain 15, 15.

Figure 4:
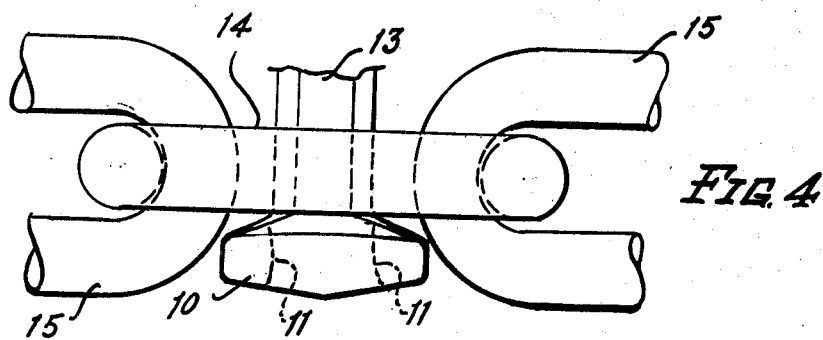
FIGURE 4 is a view of line 4—4 of FIGURE 3.

FIGURE 4 is a view on line 4—4 of FIGURE 3, wherein the base 10 and shank 13 are shown with said shank interlinked through link 14 and the ends of an arc 12 partially obscuring the space, or tolerance, between the bearings of arcs 11, 11 and the ends of links 15, 15.

Thus, when the connector hook is inserted into a link of chain and drawn fully through so that the base rests against the side of the chain link, the concave curves on the base plate will lie substantially contiguous to the ends of the adjoining links and the hook may not be rotated with respect to the chain. Since tension, rather than friction, is applied to the hook base and the chain, wear is lessened substantially and the device has a longer working life with less damage to any part. In addition, since the wasp-waist contour of the base, with its opposed concave arcs, permits the use of shorter links in the side chains, the traction unit has much greater strength, as it is well recognized that the strength of chain is increased when the links are made shorter.

It will be seen that while sufficient tolerance is required to permit the necessary flexibility of a chain assembly, the connector base of the present invention remains in a substantially fixed position with respect to the link through which the fitting of which it is a part has been interlinked, thus serving to reduce the abrasion caused by the rotation of swivel-type bases as heretofore used.

It is to be understood that the form of the invention as shown and described herein may be taken as a preferred example of the same, and that modifications may be made without departing from the spirit of the invention, within the attached claims.

What I claim as my invention and desire to secure by Letters Patent of the United States is:

1. A connector device having a non-rotatable base, for use with chain and cable assemblies, said base comprising a plate-like member having an end face, said member being integrally attached to a shank terminating in a hook, a pair of concave arcs being oppositely disposed in the periphery of said member, and said arcs being so arranged as to rest in proximate contiguity with the outermost ends of chain links adjacent the link through which the said connector device is inserted.

2. An invention as claimed in claim 1, wherein said plate-like member lies in a plane perpendicular to the longitudinal axis of said shank.

3. An invention as claim in claim 1, wherein said concave arcs are equidistantly disposed between convex arcs, said concave arcs and convex arcs combining substantially to complete the periphery of said plate-like member.

4. An invention as claimed in claim 1, wherein the said concave arcs and the said convex arcs are of substantially equal radii.

References Cited

UNITED STATES PATENTS

| 1,330,876 | 2/1920  | Krug _____ | 59—85  |
| 1,401,503 | 12/1921 | Smith _____ | 24—116 |
| 1,583,029 | 5/1926  | Thomas _____ | 59—85  |
| 2,196,398 | 4/1940  | Opperman _____ | 59—93  |

CHARLES W. LANHAM, Primary Examiner

G. P. CROSBY, Assistant Examiner

U.S. Cl. X.R.
152—233, 244